United States Patent [19]

Mori

[11] 4,249,165
[45] Feb. 3, 1981

[54] DIGITAL RADIO PAGER

[75] Inventor: Toshihiro Mori, Tokyo, Japan

[73] Assignee: Nippon Electric Co., Ltd., Tokyo, Japan

[21] Appl. No.: 30,980

[22] Filed: Apr. 18, 1979

[30] Foreign Application Priority Data

Apr. 18, 1978 [JP] Japan ............................. 53-51687[U]

[51] Int. Cl.³ .............................................. H04B 1/16
[52] U.S. Cl. ...................................... 340/311; 455/38
[58] Field of Search ......................... 325/55, 64, 466; 340/311; 455/31, 32, 38, 228; 179/2 EB, 2 EC

[56] References Cited

U.S. PATENT DOCUMENTS

| 3,114,142 | 12/1963 | Bode et al. | 325/55 |
| 3,173,128 | 3/1965 | Tatsuzawa | 325/55 |
| 3,768,090 | 10/1973 | Williams | 340/311 |
| 3,846,783 | 11/1974 | Apsell et al. | 325/55 |
| 3,882,466 | 5/1975 | Poorvin | 340/311 |
| 3,996,581 | 12/1976 | Brodeur et al. | 325/64 |
| 4,091,373 | 5/1978 | Nakamura | 325/55 |

Primary Examiner—Marc E. Bookbinder
Attorney, Agent, or Firm—Sughrue, Rothwell, Mion, Zinn and Macpeak

[57] ABSTRACT

A digital radio pager provides for the reception and detection of (1) a preamble signal for synchronizing the pager to the incoming signal, (2) a calling signal comprised of a unique word associated with the particular individual pager, and (3) a display signal representing the caller identification or other data for display. A switch is provided to enable the pager to selectively produce an audio signal either automatically upon the reception of a properly coded calling signal or, when the user does not want to be disturbed, at any particular time after receiving the calling signal. The switch further provides for selective and repeated visual display of the display signal word upon the request of the user.

6 Claims, 6 Drawing Figures

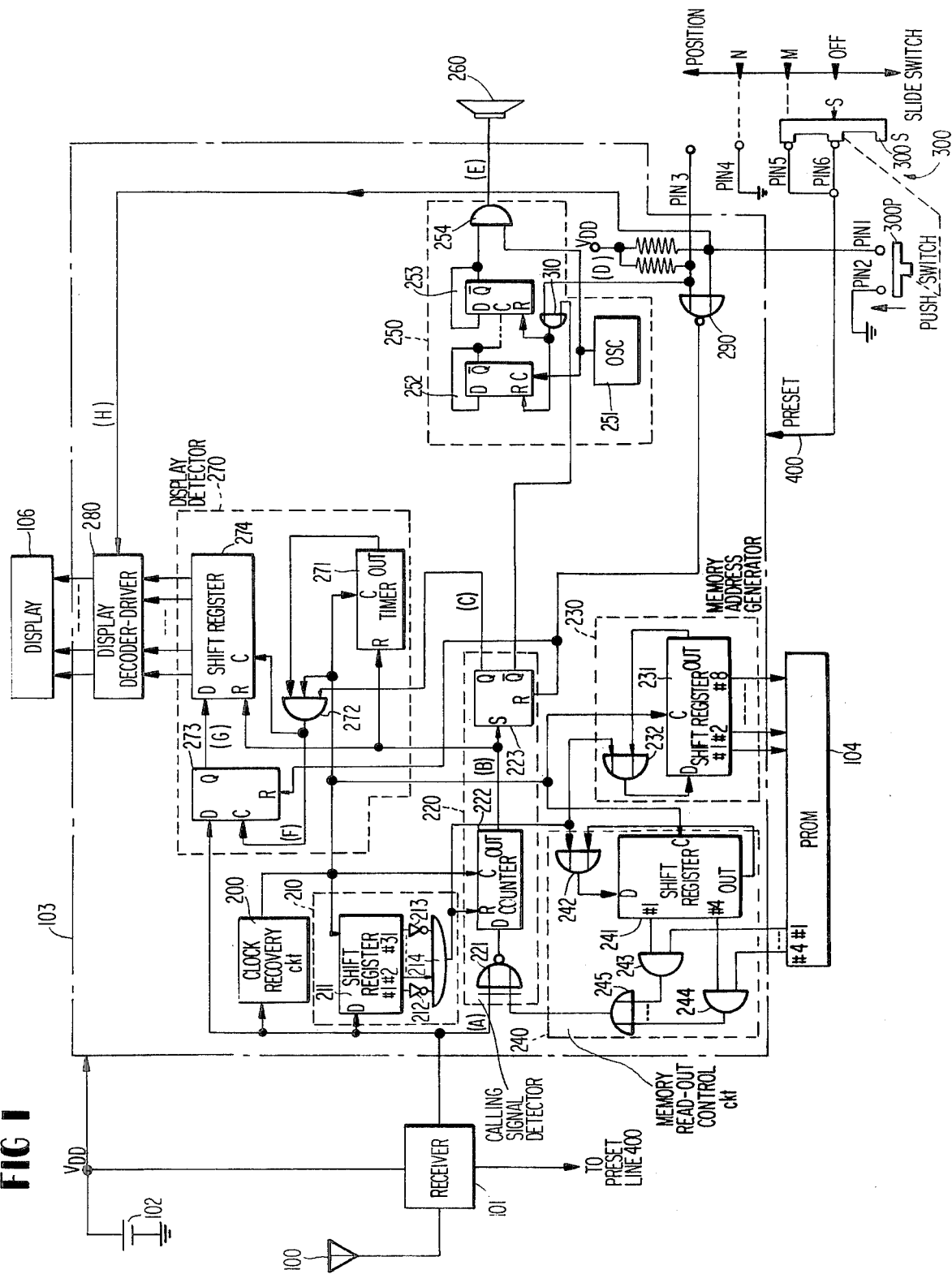

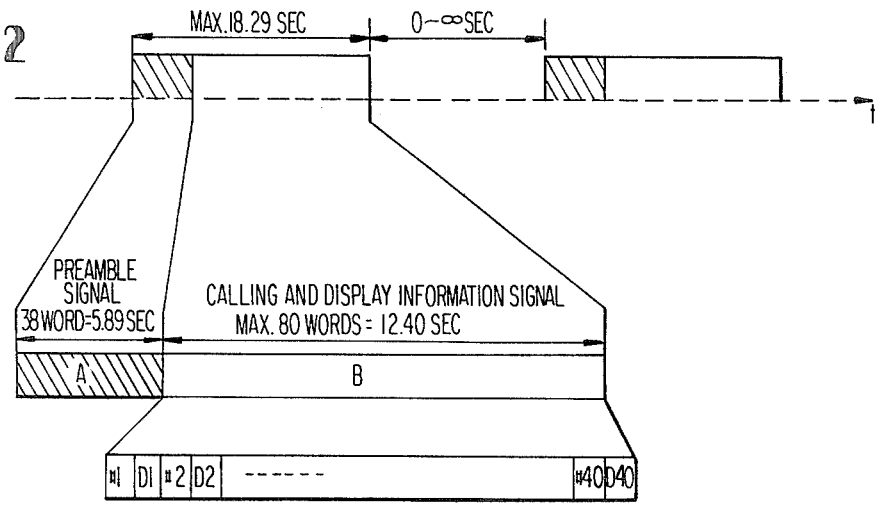
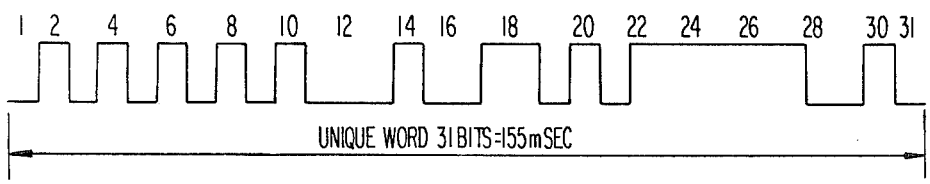
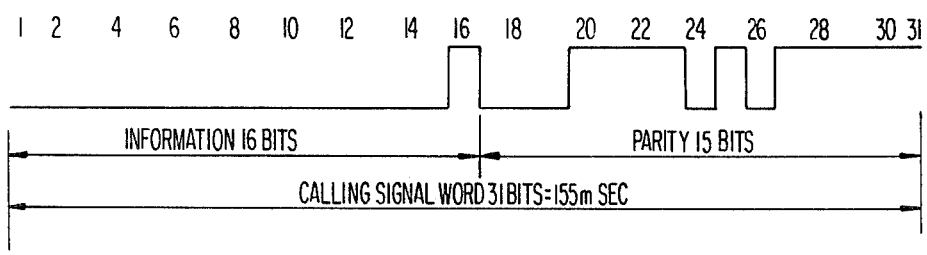
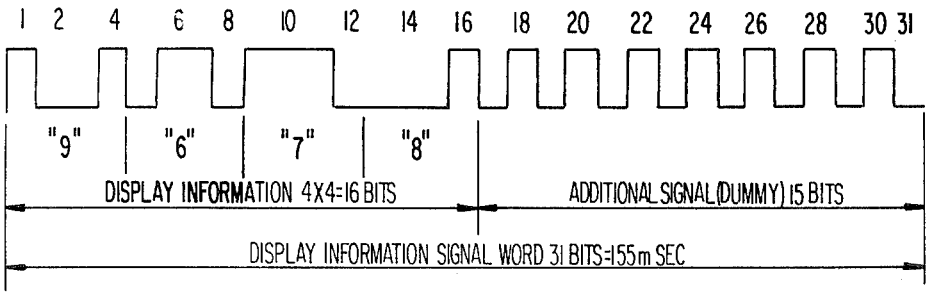

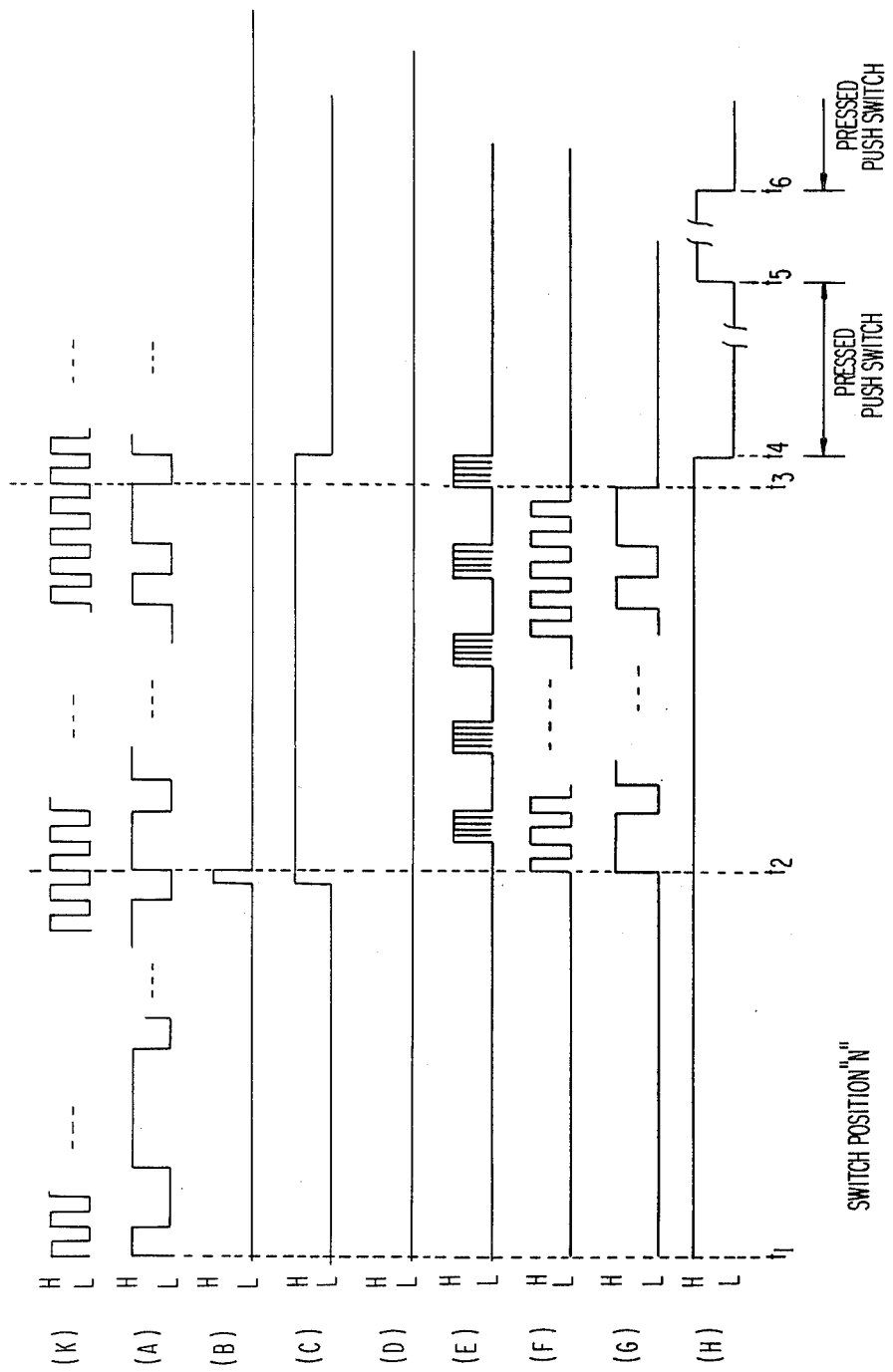

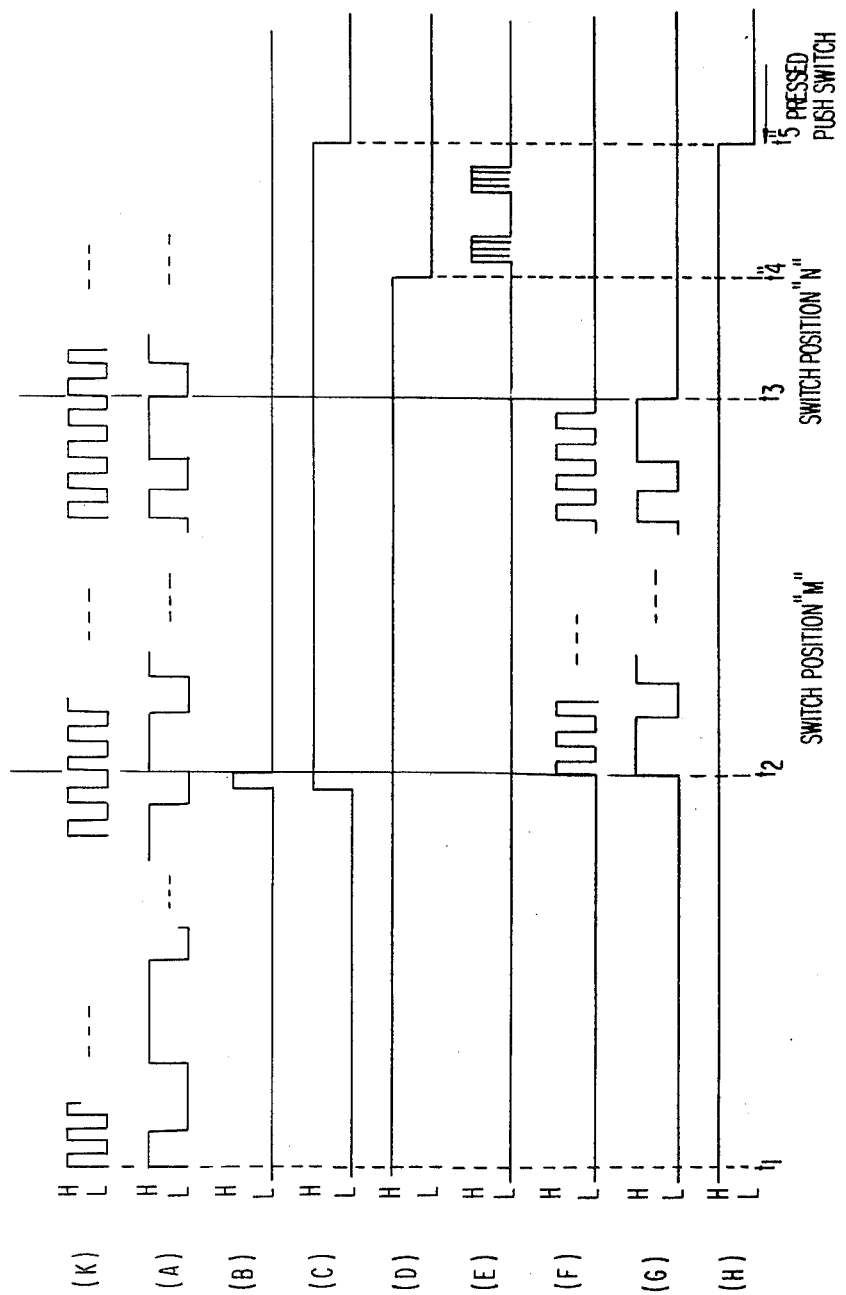

4,249,165

DIGITAL RADIO PAGER

This invention relates to a radio pager and, more particularly, to a digital radio pager having a plurality of modes of operation which can be selected by a single multi-position switch.

A typical example of this type of radio pager is shown in an Instruction Manual titled "Motorola 'Metro-Pageboy' Binary Digital Radio Pager" and published by Motorola in 1974. The pager described in this publication has a three-position slide switch combined with a push switch. When the slide switch is set to the OFF position, the pager stays turned off. When it is placed in the center position ('Mem-O-Lert' position), the pager is on to enable the correct paging address to be received and stored without the alert tone sounding, which may disturb the user when silence is desired. When the need for silence has passed, either the switch is placed in the slide ON position or the push switch is pressed to allow the stored page to be read out and emit the alert tone. The stored page is cleared after the actuation of the push switch.

With the switch in the ON position, the pager is ready to receive pages or calling signals and emit alert tone when the correct one is received. The alert tone once started can be stopped by pressing the push switch.

With this conventional pager, the stored page is easily cancelled when the user inadvertently presses down on the push switch twice in a very short period of time. This makes it impossible for the user to recheck the call. Furthermore, when the pager is provided with the dual function capability to allow two callers to be differentiated, the user cannot easily differentiate between the two tones, with the stored page read out only once and cancelled immediately thereafter in response to the subsequent pressing of the switch. Repeated sounding of the alert tone is often needed to confirm which one of the two callers has paged.

These problems, unavoidable with the conventional pager, are solved when the stored page is visually shown on a display device upon interrogation. However, this approach would involve a greater power consumption. It is for this reason that there has been no development of a display device for a pager. However, the development of liquid crystal display devices makes such use feasible.

It is therefore an object of the present invention to provide a digital radio pager, which has a display device for the caller identification and other purposes, and which is controllable by a single multi-position slide-push switch.

It is another object of the present invention to provide a digital radio pager having a display device which is actuated for power saving only when the page storage is interrogated.

According to the present invention, there is provided a digital radio pager having a display device which is free from the disadvantages encountered in the conventional pagers.

BRIEF DESCRIPTION OF THE DRAWINGS

The invention will now be described in more detail referring to the accompanying drawings, in which:

FIG. 1 shows partly in blocks an embodiment of the present invention;

FIG. 2 shows a signal format used in the embodiment;

FIGS. 3A to 3C show details of the signal format shown in FIG. 2; and

FIGS. 4 to 6 show time charts for describing various modes of operation of the present invention.

Referring to FIG. 1, when the slidable portion 300S of a three-position slidable push switch 300 is moved first from the OFF position to position M or N as shown with its center S coinciding with M or N as shown, preset line 400 connected to pin 6 of the switch 300 is grounded through pin 4 to apply voltage $V_{DD}$ from a battery 102 to a paging address decoder 103 (The switch 300 may be of the type described in the Japanese Patent Application Disclosure No. 52-14887 filed by Mitsumi Electric Co., Tokyo, Japan). At the same time, receiver section 101 having an RF amplifier, frequency converters, IF amplifiers and a frequency discriminator is set in operation to supply a train of pulses to the decoder 103.

To describe the signal format of the received pulse train referring to FIG. 2, each sequence of the pulse train has portions A and B. A is a preamble signal for the frame synchronization and for the battery saving function and B is the calling signal, i.e., paging address for the pager identification. The portion A consists of 38 31-bit binary words. Similarly, the portion B consists of 1st to 40th binary word pairs, each pair having one word representing the paging address and the other representing the caller identification and/or other data for display. In FIG. 2, the paging addresses are labeled #1, #2, ... #40, while the display data are denoted by D1, D2, ... D40. The portion A is given a time length of 5.89 seconds and B 12.4 seconds.

Figure 5:
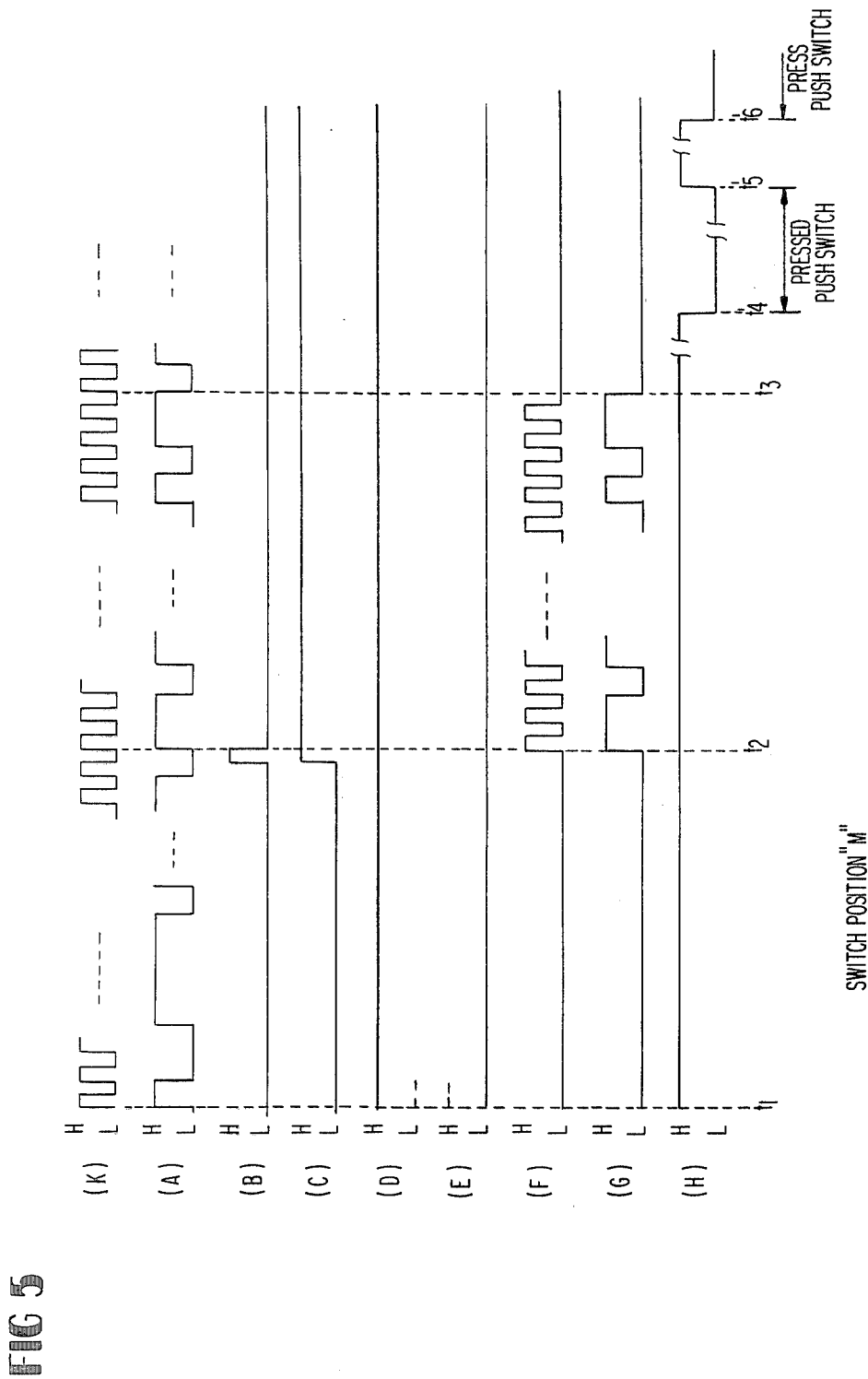

The pulse train of the same preamble signal is repeatedly transmitted with or without an interval depending on the paging traffic.

Each of the 38 words constituting the preamble portion A is a 31-bit unique word of a time length of 155 milliseconds as shown in FIG. 3A. Similarly, as shown in FIG. 3B each of the 1st to 40th paging address words or calling signal words #1, #2, ... and #40 consists of a 16-bit code corresponding to the identification number unique to the subscriber to be called, followed by 15 parity bits added to insure the error-free decoding. The display data has 16 bits for the data itself, followed by 15 dummy bits for bit number equalization as shown in FIG. 3C. It is assumed in FIG. 3C that the 16 bit portion of the display data consists of four 4-bit codes representing the decimal numbers '9', '6', '7', and '8', respectively.

Referring again to FIG. 1, the received pulse train described above is applied to a clock recovery circuit 200 (For details, reference is made to U.S. Pat. No. 4,087,627), which generates a clock pulse synchronized with the incoming pulse train. The same pulse train is applied to a preamble signal detector 210, which has a shift register 211 supplied with the clock pulse, and an AND gate 214. The respective bistable stages of the shift register 211 are connected directly or through the inverters 212 and 213 to the input of the AND gate 214, so that when the code pattern filling up the shift register 211 coincides with the unique word as shown in FIG. 3A, all the input binary bits to the AND gate 214 may be "1".

The output of the AND gate 214 constituting that of the preamble signal detector 210 and representing the presence of the unique word resets a 31-bit counter 222 of a calling signal detector 200 to enable it counting under control of the clock pulse supplied from the circuit 200. The output of the preamble signal detector 210 is also supplied to a memory address generator 230 and a memory read-out control circuit 240 to enable the decoder 103 to decode the incoming pulse train.

Referring also to FIG. 4 showing waveforms (K) and (A) through (H) observed at various points denoted by the reference characters in FIG. 1. The 31-bit calling signal word (A) is applied to one input of an Exclusive NOR gate 221 of the incoming signal detector 220 at a time point $t_1$, which is immediately after the preamble signal detector 210 has detected the last unique word in the preamble. Simultaneously, the address generator 230 provides, in timed relationship with the clock pulse, an address signal for the programmable read only memory (PROM) 104. The address signal is in the form of logic "1" appearing at one of the eight bistable stages of a shift register of the generator 230. In response to the address signal, the PROM 104, which stores the pager identification number in 31-bit binary form, provides a time sequential readout at four output terminals. The eight parallel input leads and four parallel output leads of the PROM 104 are arranged in matrix so that their cross points may be respectively scanned at the rate of the clock pulse to read out the binary bits stored at those cross points.

The readout control circuit 240 supplied with the readout output at four AND gates 243 to 244 has a shift register 241 and an OR gate 242 for feeding the output of its final stage to its D input to achieve the above mentioned scanning of the memory matrix, and for receiving the above-mentioned output from the preamble signal detector 210. The output of the AND gates 243 to 244 are supplied to the Exclusive NOR gate 221 of the calling signal detector 220.

Due to the bit-by-bit comparison at the Exclusive NOR gate 221 between the incoming pulse train and the PROM output supplied through the control circuit 240, the 31-bit pulse counter 222 of the detector 220 is filled up only when the incoming pulse train coincides in its pattern with that stored in advance in the PROM 104 corresponding to the designated pager identification. Thus, the output (B) of the 31-ary counter 222 represents the detection of the call addressed to this particular pager.

The $\overline{Q}$ output of the flip-flop circuit 223, which has been brought to a set state in response to the call-detection output (B) is supplied to an alert tone generator 250, which consists of an audio frequency generator 251, a pair of D-type flip-flop circuits 252 and 253 constituting a frequency divider for the oscillator output, an OR gate 310 for applying the above-mentioned $\overline{Q}$ output of the flip-flop circuit 223 and the potential at the pin 3 of the switch 300 to the reset input R of the flip-flop circuits 252 and 253, and an AND gate 254 connected at its input to the D-type flip-flop circuit 253 and the oscillator 251.

Since the pin 3 of the switch 300 is grounded when the latter is in the N position, R terminals of the D-type flip-flop circuits are at the ground potential, allowing the $\overline{Q}$ output of the flip-flop circuit 223 to drive the D-type flip-flop circuits 252 and 253 into operation. Thus, the alert tone signal (E) is generated to emit an alert tone from a loud speaker 260.

The call-detection output (B) of counter 222 is applied also to a display data detector 270, driving a timer 271 and a shift register 274 into a set state and thereby making the detector 270 ready for receiving the display data that immediately follows the calling signal.

The Q output (C) of the flip-flop circuit 223 is fed to an AND gate 272 of the detector 270. The AND gate 272 is also supplied with the output of timer 271 to allow the clock pulse to pass there-through so that the display data (G) starting at time point $t_2$ may be written into the shift register 274 through a flip-flop circuit 273 in response to the intermittent clock pulse (F).

At time $t_3$ where the display data (G) is terminated, the push switch portion 300P of the push switch 300 is not pressed down yet, with the logic (H) remaining a high-level logic leaving the display device 280 unactuated.

Upon depressing the switch portion 300P for the time period from $t_4$ to $t_5$, the logic (H) is brought to a low level to actuate the decoder-driver 280 to display the display data stored in the shift register. The low-level logic (H) also resets the flip-flop circuit 223 through NOR gate 290, thereby to reset the D-type flip-flop circuits 252 and 253 to stop the alert tone sounding, as will be clear from waveforms (E) and (H) at time point $t_4$. If the user wishes to check the stored data once again, he has only to press down on the push switch portion 300P to provide the low-level logic (H). The second press down is assumed in FIG. 4 to start at time point $t_6$.

Referring to FIG. 5 showing a time chart similar to FIG. 4 for the switch portion 300S set at position M, the pin 3 remains at a high level logic (D), keeping the flip-flop circuits 252 and 253 non-responsive, even when the correct calling signal is detected at the detector 220 to provide the low level $\overline{Q}$ output at the flip-flop circuit 223. In contrast, the Q output (C) at the circuit 223 is supplied to the display data detector 270 to store the display data. Depressing the push switch 300P does not provide the alert tone sounding this time, because the NOR gate 290 remains closed. However, the display data stored in the shift register 274 in the above-mentioned manner can be shown on display device 280 every time the switch portion 300P is pressed down, e.g., from $t_4'$ to $t_5'$ and from $t_6$ to an arbitrary time point.

When the slidable switch portion 300S is driven to N position at time point $t_4''$ as shown in FIG. 6, the $\overline{Q}$ output of the flip-flop circuit 223 and the low level logic at pin 3 of the switch portion 300S causes the alert signal generator 250 to emit alert tone as shown by waveform (E) in FIG. 6. Furthermore, when the push switch portion 300P is pressed down at time point $t_5''$, the low level logic is supplied through the NOR gate 290 to reset the flip-flop circuit 223 thereby to stop the alert tone sounding. Regardless of the switchover of the slidable switch portion 300S from the M to N position, the display data stored in the shift register 274 is kept unchanged and ready for display in response to depressing the switch portion 300P, until it is replaced by the next call or erased by turning off of the switch portion 300S.

As will be apparent from the foregoing description, the present invention allows the display data, that has been received and stored immediately after receiving the calling signal to be displayed repeatedly by depressing the press switch portion 300P of the single switch 300, which also permits receiving the calling signal without the alert tone sounding by placing the slide switch portion 300S in the position M. This feature obviates the possibility of inadvertent cancellation of the stored data and insures power saving for the display, while maintaining the minimum dimension for the switch.

What is claimed is:

1. A digital radio pager adapted to receive a train of pulses arranged in a prefixed format, said pulses including a preamble signal providing a reference for the synchronization of said pager, a calling signal representative of identification number for said pager, and display data representing an identification number of a caller and the like, said pager comprising:

means responsive to said pulse train for generating a clock pulse in timed relationship with said pulse train;

means responsive to said pulse train and said clock pulse for detecting said preamble signal to provide a preamble signal detection pulse;

means for storing said pager identification number;

means responsive to the preamble signal detection pulse, said pager identification number, and said pulse train, for detecting said calling signal to provide a first control signal;

bistable means for holding said first control signal;

means responsive to the output of said bistable means for annunciating the detection of said calling signal;

means responsive to said first control signal and said pulse train for detecting said display data;

means for storing the detected display data;

means responsive to said storing means for displaying the display data stored in said storing means;

means lying between said storing means and said display means for controlling the display of the display data in response to a second control signal;

a multi-position slide switch means selectively coupled with said annunciating means for selectively keeping said first control signal from being supplied to said annunciating means; and a push switch means mechanically combined with said slide switch means for providing said second control signal to said display control means to enable said stored display data to be shown on said display; whereby said stored display data can be displayed on said display means in response to the press down of said push switch means.

2. The radio pager of claim 1, wherein said bistable means further includes means responsive to said second control signal for clearing said held first control signal.

3. A radio pager unit comprising:

(a) first means for synchronizing said pager unit with an incoming signal having identification and data portions;

(b) second means responsive to said first means for receiving said identification signal;

(c) third means responsive to said second means for comparing said identification signal to a preselected identification code and for producing and storing a first control output when said identification signal corresponds to said identification code;

(d) fourth means for receiving and storing said data signal under the control of said first control output;

(e) first and second switch means each having first and second states;

(f) first indicator means for indicating the presence of said first control output:

(i) when said first switch means is initially in said first state, said first indicator means immediately indicating the presence of said first control output;

(ii) when said first switch means is initially in said second state, said first indicator means indicating the presence of said first control output upon switching said first switch means from said second state to said first state;

(g) second indicator means for indicating said data signal in response to said second state of said second switch means, whereby said data signal is maintained in said fourth means when said second switch means is in said first state.

4. The radio pager of claim 3, wherein said first indicator means produces an audio signal and said second indicator means produces a visual display.

5. The radio pager of claim 3, wherein said first and second switch means are manually switched between said first and second states.

6. The radio pager of claims 3, 4 or 5, further comprising means, when said second switch means is in said second state, for clearing said first control output stored in said third means.

* * * * *

UNITED STATES PATENT AND TRADEMARK OFFICE
CERTIFICATE OF CORRECTION

PATENT NO. : 4,249,165
DATED : February 3, 1981
INVENTOR(S) : Toshihiro Mori

It is certified that error appears in the above—identified patent and that said Letters Patent is hereby corrected as shown below:

Column 2, line 66, "200" should read -- 220 --.

Column 3, line 38, "31-bit pulse" should read -- 31-bit --.

Signed and Sealed this

Eleventh Day of August 1981

[SEAL]

Attest:

GERALD J. MOSSINGHOFF

Attesting Officer        Commissioner of Patents and Trademarks